United States Patent
Holtman (10) Patent No.: US 9,338,268 B2
(45) Date of Patent: May 10, 2016

(54) WIRELESS DOCKING WITH CARRIER SENSE CONTROL

(71) Applicant: KONINKLIJKE PHILIPS N.V., Eindhoven (NL)

(72) Inventor: Koen Johanna Guillaume Holtman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/375,949

(22) PCT Filed: Jan. 28, 2013

(86) PCT No.: PCT/IB2013/050722
§ 371 (c)(1),
(2) Date: Jul. 31, 2014

(87) PCT Pub. No.: WO2013/114263
PCT Pub. Date: Aug. 8, 2013

(65) Prior Publication Data
US 2015/0024697 A1    Jan. 22, 2015

Related U.S. Application Data

(60) Provisional application No. 61/593,968, filed on Feb. 2, 2012.

(51) Int. Cl.
*H04M 1/04* (2006.01)
*G06F 1/16* (2006.01)
*H04B 1/12* (2006.01)
*H04W 74/08* (2009.01)

(52) U.S. Cl.
CPC ............. *H04M 1/04* (2013.01); *G06F 1/1632* (2013.01); *H04B 1/123* (2013.01); *H04W 74/0808* (2013.01)

(58) Field of Classification Search
CPC ........................................................ H04M 1/04
USPC .................... 455/41.1, 41.2, 79, 522
See application file for complete search history.

(56) References Cited

U.S. PATENT DOCUMENTS

| | | | |
|---|---|---|---|
| 7,773,037 B2 * | 8/2010 | Takasu | 343/702 |
| 2007/0120752 A1 | 5/2007 | Takasu | |
| 2010/0128670 A1 | 5/2010 | Chen | |
| 2010/0128671 A1 | 5/2010 | Chen | |
| 2011/0021221 A1 | 1/2011 | Kondo | |
| 2011/0050164 A1 | 3/2011 | Partovi | |
| 2011/0053516 A1 | 3/2011 | Harteneck | |
| 2013/0175983 A1 * | 7/2013 | Partovi et al. | 320/108 |

OTHER PUBLICATIONS

Zhu J et al., "Adaptive CSMA for Scalable Network Capacity in High-Density WLAN: A Hardware Prototyping Approach", INFOCOM 2006. 25th IEEE International Conference on Computer Communications, Proceedings, IEEE, Piscataway, NJ, Apr. 1, 2006, pp. 1-10, XP031072214.
Rakesh Kumar Jha et al., "Performance Comparison of Intelligent Jamming in RF (Physical) Layer with WLAN Ethernet Router and WLAN Ethernet Bridge", Kaleidoscope: Beyond the Internet?—Innovations for Future Networks and Services, 2010 ITU-T, IEEE, Piscataway, NJ, USA, Dec. 13, 2010, pp. 1-6, XP031844908.
US 6,075,780, 06/2000, Mahany (withdrawn)

* cited by examiner

*Primary Examiner* — Tuan H Nguyen
(74) *Attorney, Agent, or Firm* — Larry Liberchuk (57) ABSTRACT

A wireless docking system in a shared radio spectrum environment includes a docking station (220) configured with a radio (224) connected to an antenna (222), a dockee (210) configured with a radio (214) connected to an antenna (212) and using a radio standard with a carrier sense mechanism for communications with the docking station, and a system to reduce sensitivity of the carrier sense mechanism in at least one of the radio (214) of the dockee (210) and the radio (224) of the docking station (220).

22 Claims, 9 Drawing Sheets

WIRELESS DOCKING WITH CARRIER SENSE CONTROL

FIELD OF THE INVENTION

This invention relates to wireless docking and, more particularly, to a wireless docking station with carrier sense control for link performance improvement and optimization.

A wireless standard, such as Wi-Fi, may be used to support wireless docking. Wi-Fi works on an open (ISM) frequency band, so Wi-Fi connections can be subject to interference from other users of the same channel, e.g. other Wi-Fi users. To prevent a communications breakdown due to this interference, Wi-Fi is designed to share the channel by having all devices use the CSMA (carrier sense multiple access) mechanism. This mechanism ensures that all devices in range of each other take turns in sending packets.

Figure 1:
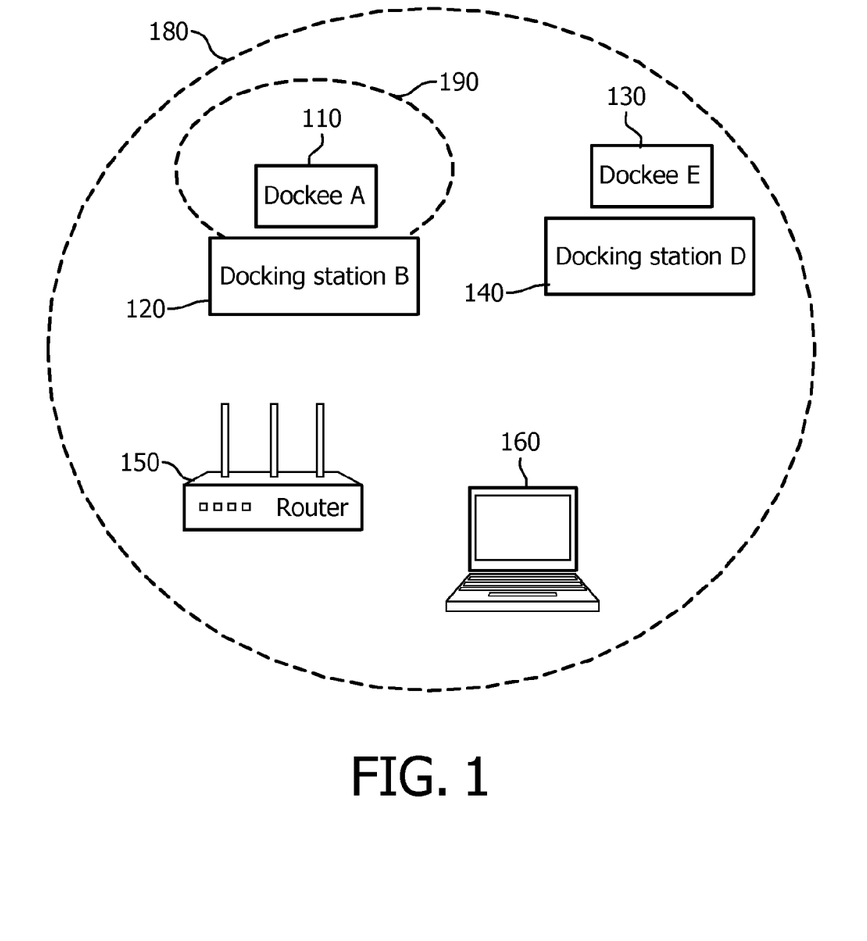
FIG. 1 shows multiple wireless devices using the same channel or overlapping channel.

FIG. 1 shows an environment where dockees A 110 and E 130, docking stations B 120 and D 140, a Wi-Fi router 150, and a laptop 160 are using the same wireless channel C. The boundary 180 indicates a range at which dockee A 110 can pick up a signal from another device using channel C. This is a simplification, as the range can be different depending on the type and transmit power settings of the other devices. For dockee A 110 docked to a docking station B 120 using wireless channel C, this means that when dockee E 130, docking station D 140, router 150, or laptop 160 are actively using the same wireless channel C (or a partially overlapping channel), being in the range 180 of the dockee A 110, their use of the channel will cause performance degradation for dockee A 110, as compared to the performance when no other active users are present. This is due to the fact that the carrier sense mechanisms in dockee A 110 and docking station B 120 will hold off using the channel C if they sense that another device is using the channel. This degradation can cause, for example, degradation in screen updating speed, which could make it impossible to comfortably watch a video via the wireless docking connection, even though it may not cause a complete loss of the connection.

Carrier Sense Multiple Access (CSMA)

Assume that dockee A 110 in FIG. 1 is a general-purpose device, such as a mobile phone, using a 802.11n ('Wi-Fi n') radio. Under normal circumstances, the range at which the carrier sense mechanism of dockee A 110 will pick up signals might be indicated by the area 180. The carrier sense (or carrier detection) mechanism in a compliant 802.11n device, such as dockee A 110, is required to prevent transmissions by the device if either of the following is true:

1. A radio signal encoded according to the Wi-Fi standard is sensed in the channel, with a signal strength of at least X db.

2. Any signal is sensed in the channel, with a signal strength of at least X+Y db. (i.e., the signal has to be significantly stronger than in the first condition).

The exact values for X and Y, in the case of 802.11n, may be found in section 20.3.22.5 of the IEEE 802.11n-2009 standards document. For some signal coding in some earlier Wi-Fi standards, the second condition does not always need to be implemented.

The above two conditions mean that transmissions by any of the devices 130, 140, 150, and 160 may cause dockee A 110 to wait before accessing the channel, causing a performance degradation in the communication between dockee A 110 and docking station B 120.

A particular problem is that a general-purpose 802.11n radio implementation, as expected to be present in dockee A 110, will respect the above constraints upon when a device can transmit, even if dockee A 110 itself is transmitting at a low power. For example, the constraints will still apply even if dockee A 110 transmits at a low power that is sufficiently strong to be understood by the nearby docking station 120, but too weak to cause a signal strength Z<<X at the antennas of the further away devices 130, 140, 150 and 160, thereby making it very unlikely that this transmission would interfere with the concurrent use of channel C by devices 130, 140, 150 and 160. The Wi-Fi standard (and most wireless standards) was not designed with the special case of radio communication over a very short distance in mind. So, common implementations of these Wi-Fi standards typically do not make exceptions to optimize the channel use when implemented according to the above example. A certification regime according the standard may even disallow the devices from making certain exceptions.

One way to improve performance in the situation of FIG. 1 is to isolate dockee A 110 and docking station B 120 from their environment by enclosing them into, e.g. a faraday cage. However, this is not a practical solution for the case of wireless docking. Another way to improve performance is to ensure that most devices in the area use different, non-overlapping channels. However, the number of channels available for use by 802.11n radios is limited, so this is only a partial solution at best. For example, in an open plan office building, assuming one docking station per desk (per employee), and an average floor space of 5×5 meters per employee, then, within a 50×50 meter grid around a single docking station, 99 other docking stations can be found on the same floor. If channel-bonded 802.11n is used, there are only some 10 non-overlapping channel pairs to choose from. This means that in an office environment FIG. 1 shows a realistic, maybe even optimistic, representation of other in-range devices under the assumption that only devices using the same channel are shown.

In the paper "*Adaptive CSMA for Scalable Network Capacity in High-Density WLAN: A Hardware Prototyping Approach,*" by Zhu, J. Metzler, B. Guo, X. Liu, Y., in: *INFOCOM* 2006, 25*th IEEE International Conference on Computer Communications, Proceedings*, the above problem is described and it is suggested that in dense WLAN environments the high sensitivity of the carrier sense mechanism can be a performance problem. A solution is proposed to solve the problem by having the concerned devices use a built-in carrier sense level (CAA) adaptation algorithm (FIG. 3 in the paper) to steer towards a higher threshold (stronger signal strength) for the carrier sense mechanism. FIG. 11(*a*) in the paper shows, for a test in an open plan office shown in FIG. 9 of the paper, the performance improvements achieved using this technique. However, if applied to wireless docking, this technique requires special hardware and software components in both the dockee and the docking station. Furthermore, it requires a complex control loop between the dockee and the docking station to achieve an optimal setting. This technique is complex and expensive to implement, and is not easily adapted to existing wireless devices.

In contrast to the above, certain embodiments described herein implement a control of the carrier sensing, such that the dockee is less sensitive in detecting carrier signals from other devices. Advantageously, the dockee can communicate more readily with the docking station without interferences from transmissions by other devices. In one embodiment, a noise signal is generated to raise the noise floor in an area so that only signals from nearby devices are strong enough to reach above this floor. In another embodiment, a signal absorber is used to reduce the signal strengths passing through the absorber, so that only signals from nearby devices are strong enough to reach the carrier detection threshold. In another embodiment, the carrier detection threshold in the dockee and/or the docking station is raised so that only signals from nearby devices are strong enough to reach this threshold.

Advantageously, several embodiments described herein do not rely on any built-in mechanism in the dockee that makes the carrier sense a mechanism of the dockee using a different threshold. The threshold is lowered by a mechanism external to the dockee. Second, if a mechanism in the dockee is used, this mechanism does not use a control loop as proposed in the above-mentioned paper to achieve an optimal setting for the threshold by using properties of the radio environment. Instead, the concept of physical docking is used as a discriminator between entering a 'normal' carrier sense regime and a modified carrier sense regime. This avoids having to implement a complex fail-safe mechanism in the design of a control loop such that it may not disadvantageously affect other channel users in the event of a control loop failure.

Upon application of an embodiment of the invention described herein, the range as shown in FIG. 1 in which dockee A 110 can pick up a signal from another device using, for example, channel C is reduced, as indicated by the smaller range labeled as 190. Thus, even if there are Wi-Fi or other devices in range that use channel C, and/or an overlapping channel, there will be improved performance of the link between the dockee and docking station. This can be particularly desirable if many wireless docking stations are all very close to each other in a single room or area, e.g. in a web cafe or in an open-plan office.

Certain embodiments herein advantageously allow for channel C to be used even if there are Wi-Fi (or other) devices in range that use the channel C, and/or an overlapping channel, thereby maximizing the performance of the link between dockee A 110 and docking station B 120.

Certain embodiments herein achieve maximum performance, preferably with minimal hardware or software changes to dockee A 110, and in some embodiments with no software changes. The invention relies in part on the fact that it is possible to control the carrier sense mechanism of (at least some) Wi-Fi chipsets by external software i.e., these mechanisms are not completely hard-coded in the firmware.

In one embodiment, the invention relates to a docking station for wireless docking with a dockee in a shared radio spectrum environment, wherein the dockee is configured with a radio connected to an antenna using a radio standard with a carrier sensing mechanism for communications, the docking station including: a radio connected to an antenna; and a noise generator; wherein the noise generator transmits noise, or transmits another signal that masks transmissions in the radio standard, such that within an area around the dockee, the signal of the noise generator does not prevent transmissions by the radio of the docking station from being detected or received by the dockee radio, but is strong enough to reduce the ability of the carrier sensing mechanism of the dockee radio to detect transmissions by other devices in the shared radio spectrum environment.

In another embodiment, the invention relates to a docking station for wireless docking with a dockee in a shared radio spectrum environment, wherein the dockee is configured with a radio connected to an antenna using a radio standard with a carrier sensing mechanism for communications, the docking station including: a radio connected to an antenna; and a radio absorber having a slot for the insertion of the dockee, such that upon insertion of the dockee, the radio absorber substantially surrounds the antenna of the dockee, wherein the radio absorber is made of a radio absorbing material for absorbing the energy of radio signals.

In another embodiment, the invention relates to a wireless docking system in a shared radio spectrum environment wherein a dockee is configured with a radio connected to an antenna using a radio standard with a carrier sensing mechanism for communications, and the docking station is configured with a radio connected to an antenna; the docking system further comprising: a first radio modification module for switching the operation of the dockee radio between at least a first mode and a second mode; a sensor for detecting physical docking between the dockee and the docking station; and a control system configured to change the mode of the first radio modification module depending at least upon the readings of the sensor.

In general the various aspects of the invention may be combined and coupled in any way possible within the scope of the invention. The subject matter that is regarded as the invention is particularly pointed out and distinctly claimed in the claims at the conclusion of the specification. The foregoing and other features and advantages will be apparent from the following detailed description taken in conjunction with the accompanying drawings.

DETAILED DESCRIPTION OF THE EMBODIMENTS

Wireless Docking

Wireless docking uses wireless technologies to connect portable devices such as mobile phones, laptops, etc. to typically stationary docking environments. Such portable devices are called a dockee or wireless dockee. The wireless docking environment gives the dockee access to peripherals, such as a large screen, a keyboard, a mouse, and input/output ports that can be used to improve the experience and the productivity of the end user when interacting with applications running on the dockee. One example of wireless docking is to give the user of a mobile phone the ability to use a bigger screen, such as a TV or PC monitor, when interacting with an application, such as an e-mail client or a web browser, running on the mobile phone.

To realize wireless docking, the dockee connects wirelessly to one or more wireless docking stations, also known as wireless docking hosts, in order to gain access to the peripherals in the wireless docking environment. In the most simple case, the wireless docking environment is realized by having at a location (in a living room, on a desk in an office, etc.) a single wireless docking station, to which peripherals like TVs, PC monitors, keyboards, etc. are all connected. In one specific example, a Bluetooth wireless keyboard and a USB webcam could be connected to a docking station in order to become part of a docking environment. Thus, the dockee would be connected to the wireless keyboard and USB webcam after docking with the docking station.

In practical terms, Wi-Fi will be the most logical wireless protocol to enable wireless docking between the docking station and the dockee device, as many (potential) dockee devices come with Wi-Fi support already built-in. However, a full wireless docking system that aims to ensure cross-device and cross-manufacturer compatibility between different dockees and docking stations in a user-friendly way is further defined by a set of mechanisms or protocols between dockees and docking stations that realize easy and convenient automatic Wi-Fi connection setup between the dockee and the docking stations, and their associated peripherals.

In the wireless docking environment, the state of 'being docked', e.g. the docked state, in this context is the state where a dockee has access to all peripherals in the wireless docking environment, or at least to all peripherals in the wireless docking environment that the dockee has chosen to access. The grouping of many peripherals into a single wireless docking environment and then allowing the user to connect the dockee with all peripherals in the wireless docking environment by initiating a single 'dock' action is a key concept to enable ease of use. The state of being 'undocked' is a state where there is no access to any of the peripherals in the wireless docking environment. Preferably, the docking and undocking procedures are both as automatic as possible, requiring minimal user intervention and minimal prior configuration by a user.

A docking station could be realized in many ways. It could be a specially designed single-purpose device, or it could be, e.g., a PC running some software applications, which may have some extra hardware attached to make docking more convenient and/or efficient. A HDTV might also have built-in functionality to act as a docking station. One design option that is considered for all these classes of docking stations is to equip the docking station with a cradle, in which the dockee can be placed. The placing of the dockee into the cradle will generally have the effect of triggering a dock action. Another option is to equip the docking station with a docking pad, a surface onto which the dockee can be laid down. Again, the laying down action would trigger a dock action, at least when the dockee was in the undocked state prior to the laying down action.

Equipping a docking station with a cradle, pad, or other demarcated area has the advantage that if a single room or single area in a building contains many docking stations all within potential wireless range, there will be an easy way for a user to indicate which station and implied wireless docking environment the user wants to dock with.

Another trigger action may be by using a menu on the dockee device. For example, in a living room, when a user is sitting in a chair with the dockee device in their hand, it would be convenient to trigger a docking action with a docking station that is not within arm's reach, by a using a menu on the dockee. Additional triggers to get from an undocked to a docked state include (a) scanning an NFC (Near Field Communication) tag on a docking station by a dockee; (b) pressing a specific button on the dockee or the docking station. A maximally useful wireless docking standard enables many of these types of trigger actions, thereby giving device manufacturers and end users the choice to select what is most convenient for them.

To create maximum user friendliness, the triggering of an 'undock' action should not always be the inverse of a triggering of a 'dock' action. For example, a docking can be initiated automatically by the user placing a mobile phone dockee on a docking pad. However, it may not be convenient if undocking happens automatically when the user picks up the mobile phone to answer a call. A Wi-Fi link between the phone and the docking station can be maintained just as well when the user has picked up the phone from the docking pad. However, in some cases the throughput of the link may suffer when the phone is removed from the docking pad, for example by the user blocking a direct signal path with their body.

If a dockee is laid on a docking pad, positioned in a cradle, or placed by the user inside an area (physically demarked or just known to exist) that is associated with a docking station or docking environment, the dockee is considered to be in the state of being 'physically docked.' If a dockee enters the state of being physically docked, this may trigger a docking action, resulting in the dockee also becoming logically docked. If the dockee leaves the state of being physically docked, the dockee might not necessarily stop being logically docked.

Physical docking can be done by a user for a number of reasons, and several of these reasons may apply at the same time:
1. To trigger a logical docking process.
2. To ensure that the dockee is connected to a power source, e.g. wireless charging by placing a phone on a charging pad.
3. To optimize, or make more predictable, the quality of the wireless communication between the dockee and the docking station/docking environment. The quality (speed, latency) and predictability of the communication will after all have an effect on the utility of the combination of the dockee with the peripherals in the docking environment.
4. To create an input to a security mechanism, so that (a) the docking process can proceed more securely and/or (b) the docking process can omit some security dialog steps that the user would have to go through otherwise when logically docking from a distance. Wireless connections can be subject to man-in-the-middle attacks by which a (remote) attacker with the right equipment can impersonate being a dockee to a docking station, or a docking station to a dockee. While well-known mechanisms like pin code authentication (from Bluetooth) can lower the chance of successful attacks, these are user-unfriendly. Physical docking with a detection mechanism for physical docking that is hard for a remote man-in-the-middle attacker to influence is, therefore, an important route to enhancing security without losing user friendliness.

Several important process elements are identified for the process that leads from an undocked to a docked state. These process elements do not have to occur in a fixed order, nor do they always have to occur for every type of envisaged docking process. Some of these elements are:

1. A trigger or kickoff mechanism/event that gets the docking process going, where this trigger may select a single wireless docking environment among multiple wireless docking environments that are all within wireless range.

2. The creation of one or more secure wireless connections between the dockee and docking station(s) or other elements in the docking environment, with the initialization of these secure connections often relying on 'trust relation creation/detection' mechanisms that guard against a man-in-the-middle attack.

3. The selection of optimal wireless protocols and interface settings to use for communications to and from peripheral functions in the docked state, e.g. Wi-Fi channel.

Noise Bubble

Figure 2:
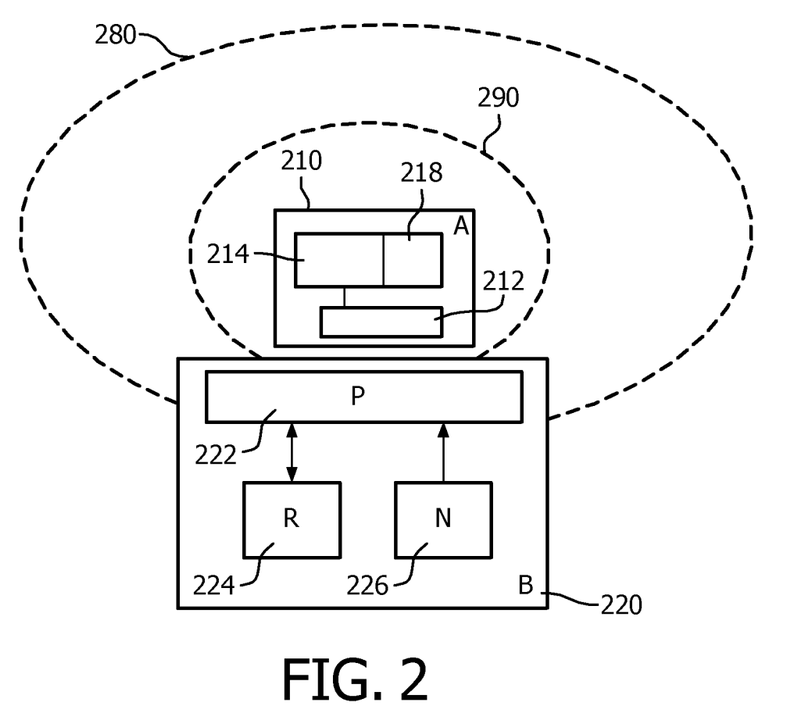
FIG. 2 shows a dockee with a docking station according to an embodiment of the invention.

A docking station in accordance with an embodiment of the invention is shown in FIG. 2. The docking station B 220 is equipped with an antenna P 222. While the antenna in the docking station may take on different shapes, depending, for example, on the shape and size of the docking station in which the antenna resides, in a preferred embodiment this antenna is shaped to be integrated with a pad covering the top of the docking station, and the dockee is laid directly onto the pad.

The docking station B 220 is also equipped with a radio R 224 connected to the antenna P 222. In certain embodiments a noise generator N 226 is also connected to the antenna P 222, so that the noise generator N 226 transmits a noise signal in channel C in the direction of the antenna of the dockee A 210. The noise generator N 226 does not need to be connected to the antenna P 222, but may be connected to another antenna, if available, in the docking station.

The dockee A 210 includes a radio 214 connected to an antenna 212. Optionally, in certain embodiments described below dockee A 210 includes a dynamic transit power control (TPC) mechanism 218.

When docking, a relationship is created when dockee A 210 is brought close to antenna P 222 of the docking station B 220. Being "brought close" is in comparison to distances to the antennas of all other devices in the wireless environment. The "closeness" required to create the docking relationship is affected by:

1. the antenna P 222 being physically close to the dockee A 210, and/or
2. the antenna P 222 being directional in the direction of the dockee A 210, and/or
3. the antenna P 222 and the radio R 224 being configured to detect only very strong signals, so that only the signal of the nearby dockee A 210 is strong enough to be detected. This may be implemented in hardware and/or software, for example, with a mechanism that involves a feedback loop to determine the best setting.

Note that the closeness of the dockee A 210 and the docking station B 220 and/or the directionality of the antenna P 222 ensures a high link budget between the dockee and the docking station, as compared to normal situations of using standard Wi-Fi, and as compared to the link budget between the dockee A or docking station B and any of the other devices in the wireless environment. This comparatively high link budget is exploited in some embodiments of the invention.

Advantageously in the configuration of FIG. 2 with the dockee A 210 being physically docked, the CSMA mechanism in radio R 224 of the docking station B 220 will correctly delay transmissions by the docking station B 220 if the dockee A 210 is sending, but will not delay a transmission if any other wireless devices in the wireless environment are sending, because the transmissions by these other wireless devices are below the detection threshold of the radio R 224.

Figure 3:
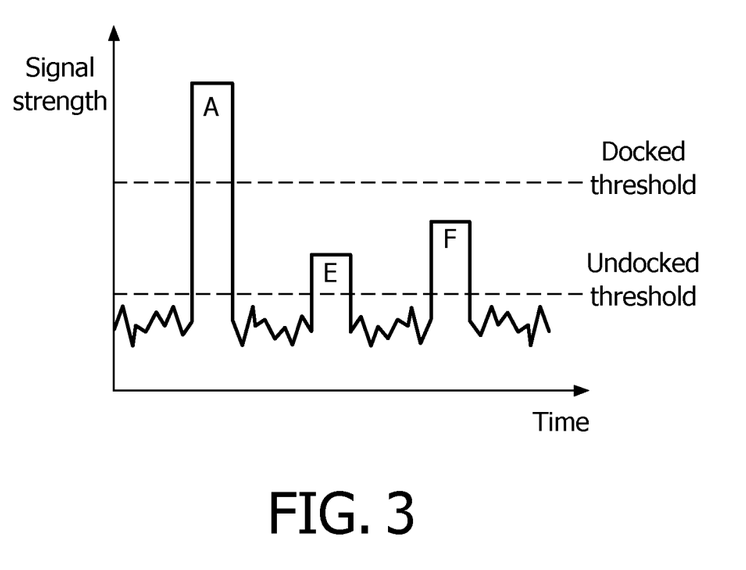
FIG. 3 shows signal strengths in relation with the docked and undocked thresholds according to an embodiment of the invention.

As illustrated in FIG. 3, the detection threshold for a docked state may be modified to be higher than that of the detection threshold for an undocked state. Because the signal from the dockee A is higher by virtue of the close proximity and/or the direction of the antenna P of the docking station B, even if the detection threshold is raised in the docked state, the docking station B can still detect transmissions by the dockee A. The transmissions by other devices, such as E and F shown in FIG. 3 are not detected in the docked state but would otherwise be detected in the undocked state.

Figure 4A:
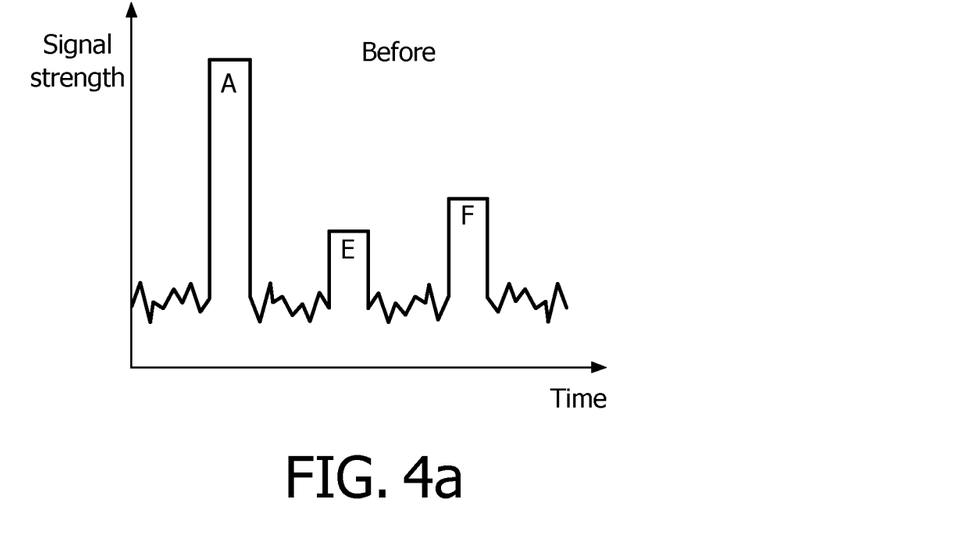
FIGS. 4(a) and (b) show, respectively, signal strengths before and after noise signal is added according to an embodiment of the invention.
Figure 4B:
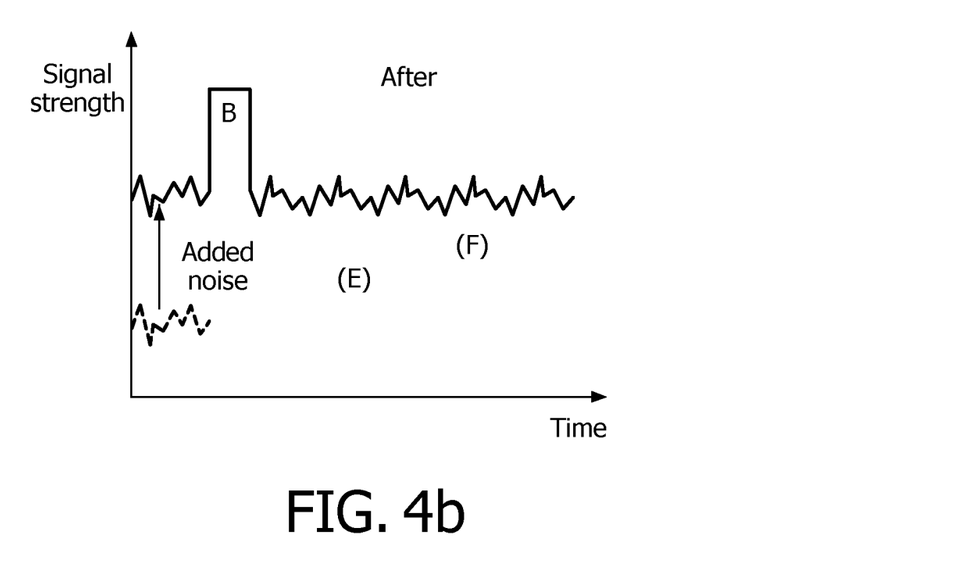

In one embodiment, to raise the detection threshold for a docked state the noise generator N 226 sends noise in channel C in the direction of the antenna of the dockee A 210. FIG. 4(a) shows the signal strengths for the docking station B and other devices E and F received at the dockee A 210 before the noise generation. FIG. 4(b) shows the signal strengths for the docking station B and other devices E and F received at the dockee A 210 after the noise generation. As shown in FIG. 4(b), this noise has the beneficial effect of raising the noise floor for the radio in dockee A 210 to a level where it meets or exceeds the signal strengths received from other devices E and F. This causes the radio in dockee A 210 to be unable to detect transmissions by other devices E and F, while still being able to detect transmissions from B.

As shown in FIG. 2, with the addition of the noise generation, the signal detection range of the dockee A 210 has shrunk from the range 280 to the range 290. Thus, dockee A 210 is in a 'noise bubble' created by the docking station B 220.

The above-described 'noise bubble' enables the CSMA in the radio of the dockee A 210 to delay transmissions by the dockee A if the docking station B 220 is sending, but will not delay a transmission if any of the other wireless devices in the wireless environment are sending, because the transmissions by these other wireless devices are masked by the noise.

As a result of the above antenna-radio configuration and noise bubble, dockee A 210 and docking station B 220 may use the full spectral capacity of channel C, even where other devices are in the normal range 280 of the dockee A 210.

In some embodiments of the dockee A 210, the radio 214 is configured in such a way that a high noise floor generated by the noise generator N 226 is not interpreted as the presence of a lot of (modulated) energy in the channel, i.e. the presence of a radio using a channel modulation not known to the dockee A. Such an interpretation would cause the CSMA mechanism in the dockee A, if it is built for example according to the 802.11n standard, to delay transmission, possibly indefinitely. Therefore, in another embodiment, dockee A is configured to avoid making these incorrect interpretations by using a carrier signal discrimination method. In another embodiment the noise generator N 226 is configured such that the noise floor is not raised too high causing the dockee A 210 to delay transmission.

Note that the purpose of the noise generator N is to generate a disturbance signal with a certain amplitude that prevents the dockee A 210 from detecting the carrier signals of other devices, except for the docking station B. In one embodiment, the disturbance signal is white noise. Other disturbance signals are also contemplated, as many modulated (non-noise) signals will also work, as long as these signals are not interpreted by the dockee A as Wi-Fi carrier signals.

The noise generator preferably limits its output to generating a disturbance on the channel C, or part of channel C, to achieve this effect, although leakage outside the channel C will not interfere with the correct working of the above embodiments. Applicable laws and regulations may however limit the frequencies at which the noise generator creates a (significant) signal, e.g. leakage outside of the ISM bands needs to be low.

In another embodiment the optional dynamic transit power control (TPC) mechanism 218 as shown in FIG. 2 is implemented. The TPC 218 is configured to control the radio 214 of dockee A 210 to transmit at a low power setting. The low power setting is high enough so that the radio 224 in the docking station B 220 can decode the messages, but not much higher. The TPC 218 will reduce undue interference by the dockee A upon other wireless devices in the wireless environment.

Note that for the Wi-Fi standard 802.11a, TPC is mandatory in the 5 GHz band in the European Union (EU), and is implemented according to the standard 802.11h. Wi-Fi 802.11g and 802.11n have built-in TPC mechanisms, but their use is not mandatory, although the mechanisms are implemented in most common Wi-Fi hardware and software. The Wi-Fi TPC mechanism is described in IEEE 802.11-2007.

For a Wi-Fi based embodiment, preferably the dockee A 210 has its TPC mechanism enabled, and one or more of the following mechanisms is used in the docking station B 220:
1. The docking station supports Wi-Fi TPC reports, with report contents, in particular the link margin in the report, filled in to support the above transmission power setting.
2. The docking station supports Wi-Fi TPC reports, with power constraint element contents, in local maximum transmit power for the channel, filled in to support the above transmission power setting. Note that the local maximum transmit power filled in will generally be much smaller than the maximum transmit power allowed according to regulatory constraints.

According to another embodiment, the dockee and docking station adjust transmit power levels using a specialized pre-arranged protocol that is not part of the Wi-Fi specification. Such a protocol may also be used to tune radio parameters other than transmit power. For example, some radios have tunable levels in their CSMA mechanisms or in their pre-amplification stages—these levels could be adjusted to maximize the link budget while minimizing the potential impact on other users of channel C.

In another embodiment, the noise generator N 226 and antenna P 222 are configured to ensure that the noise signal received by other devices in the area is relatively small— below the signal strength of the other devices that are communicating. This can be achieved by:
1. the antenna P 222 of the docking station B 220 being directional, so that it does not send signals to devices other than the dockee A 210, and/or
2. the antenna P 222 and the noise generator N 226 being configured, in hardware and or software, possibly with a mechanism that involves a feedback loop to determine the best setting to send only a weak signal, so that only the close-by dockee A 210 is strongly affected by the noise. This ensures that the other devices do not suffer from undue interference by the docking station B 220.

In one embodiment, the antenna P 222 is a directional antenna having a noise generator N 226 connected. The docking station B 220 also has general-purpose omnidirectional antennas (not shown) without a connection to the noise generator, i.e. the same type of antennas as a general Wi-Fi device or access point, so that the docking station B 220 can make an optimal connection with the dockee through the general-purpose omnidirectional antennas if the dockee is not placed directly on top of the docking station. If there are many active users on the channel C, this longer-range connection will, of course, have a degraded performance compared to the connection via the antenna P 222.

Note that a beam steering antenna is a directional antenna whose direction can be changed electronically, without moving the elements of the antenna physically. In an embodiment herein with a beam steering antenna, a noise generator N 226 could be combined with a beam steering antenna in the docking station B 220 to allow docking with high performance at large distances, even while the antenna in the dockee A 210 remains omnidirectional. The beam-steering of a noise signal as described above is easier than the beam steering of a Wi-Fi signal. In one embodiment, the docking station will be equipped with a beam-steering antenna for the noise signal, but the Wi-Fi signal will be transmitted and received using a normal antenna, or using beam steering, via the same or via other antennas, with a wider beam.

Dampening Foam

Figure 5A:
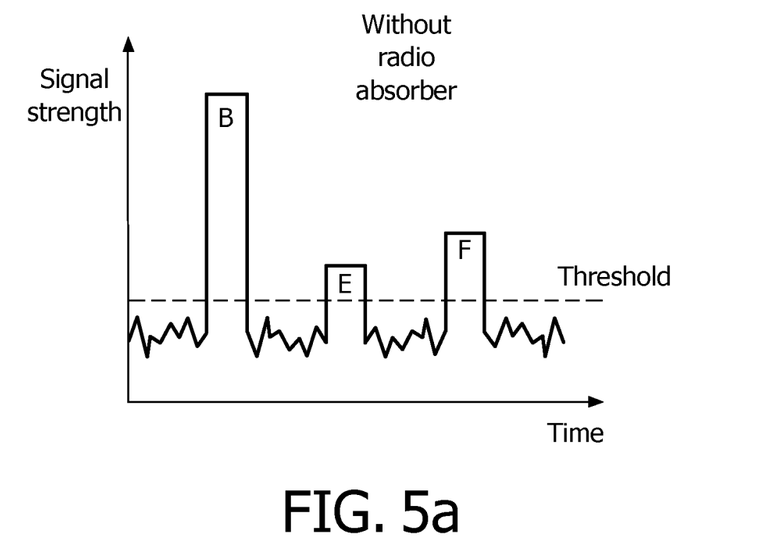
FIGS. 5(a) and (b) show, respectively, signal strengths before and after a radio absorber is added according to an embodiment of the invention.
Figure 5B:
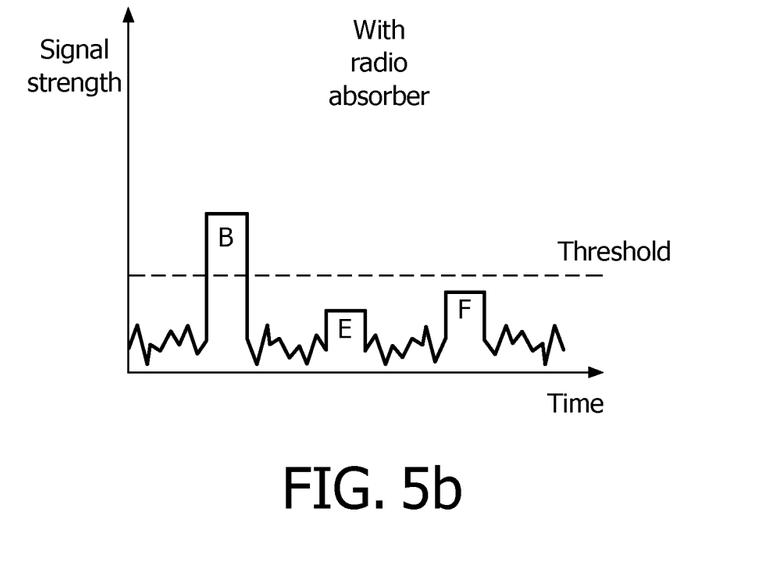

In another embodiment herein, the docking station is equipped with a radio absorption element, so that the radio signals are attenuated to such an extent that only signals from nearby devices are strong enough to reach the carrier detection level. Illustratively FIG. 5(a) shows an example of the radio signals without the radio absorber. The signal strengths of docking station B and other devices E and F in the wireless environment are all at above the detection threshold of the dockee. When a radio absorber is used as illustrated in FIG. 5(b), the signal strengths received at the dockee decrease, so that only the signal from the nearby docking station is strong enough for even its attenuated signals to reach the carrier detection and signal decoding threshold.

In an embodiment herein a docking cradle is configured with radio shielding or absorption materials. However, a problem with the radio shielding/absorption cradle design is that to create good shielding the cradle needs to fit the shape of the dockee (for example, a specific model of a mobile phone) as exactly as possible. If there are gaps, then the shielding and/or dampening effect is reduced. This means that different models of cradles are needed for different models of phones, or that an end user has to do some customization on the cradle after buying it.

Figure 6:
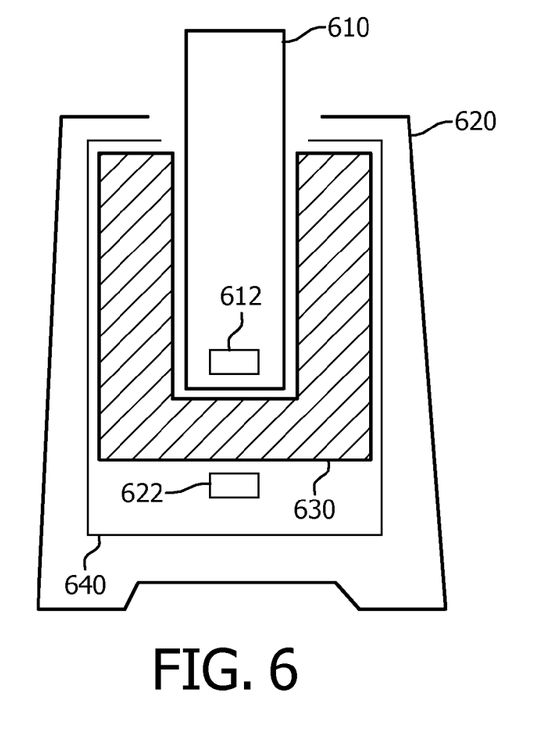
FIG. 6 shows a dockee with a docking station according to an embodiment of the invention.

FIG. 6 shows a cross-section view of a docking station in accordance with an embodiment of the invention. The docking station, realized as a docking cradle 620 includes an antenna 622 which communicates with the antenna 612 located in the dockee 610. When a docking station is realized as a cradle, it may be referred to as a docking cradle. The docking cradle 620 has a foam element 630 in which the dockee 610 fits snuggly, so that the foam element 630 substantially surrounds the antenna 612. The docking station may also include a shielding element 640.

The foam element 630 is made of a special purpose foam material that absorbs radio waves (the energy of the radio waves) passing through it. In one embodiment, the foam can also be deformed to a certain extent. There are several manufacturers who make foam material with these properties, e.g., TDK™ and ARC Technologies™. The typical current use of this foam is to line the walls of anechoic radio testing chambers. Such foam is manufactured by mixing a conducting material (e.g. carbon particles) with a polystyrene foaming agent. Radio waves entering the foam create currents in the conducting material, with these currents then being dissipated into heat because of the internal resistance of the material.

Figure 7:
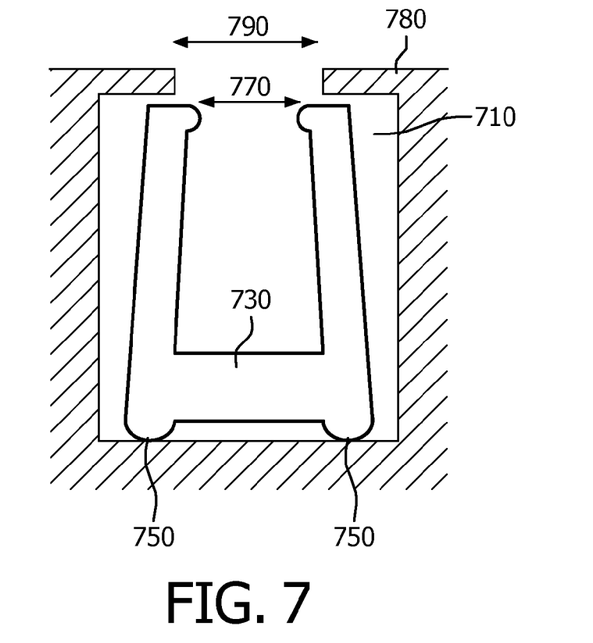
FIG. 7 shows a radio absorber in a docking station according to an embodiment of the invention.

In one embodiment the foam element are somewhat flexible, allowing it to deform to give a tight fit around a range of dockee shapes. FIG. 7 shows a more detailed embodiment of the foam shape, where the foam element 730 can deform by being compressed, but also by bending away into the enclosing space 710. Because the foam element 730 can be compressed and bent, different shapes and sizes of dockee devices may be accommodated into the slot 770, and yet still can provide substantial absorption of outside radio signals that might reach the antenna of the dockee. The foam 730 may be fixed in place, for example, by glue at glue spots 750 at the bottom of the enclosing space.

Note that FIGS. 6 and 7 show that the gap 790 (the slot) in the non-deformable material 780 making up the top cover of the cradle, if material with such a slot 790 is present there, should be somewhat wider than the initial slot 770 in the foam in its non-deformed configuration. The slot 790 in the top has to be sized to accept the maximum envisaged dockee size; the non-deformed configuration of the slot in the foam has to be sized to fully enclose the minimum envisaged dockee size. The foam element, or the set of foam elements, is preferably constructed to keep the dockee nicely centered inside the top cover slot when the dockee is inserted, creating a visual effect of 'neatness' that is valuable to the user. In one embodiment, the shielding element 640 in FIG. 6 is made from a radio-reflecting material, e.g., metal foil. Note that this shielding element is optional, as the foam element also works as an antenna efficiency reduction device, without a separate shielding element, by absorbing most of the radio energy of waves passing through it. The shielding material 640 can be used, however, to improve the overall efficiency of the antenna efficiency reduction effect, especially if a desired goal is to save on the volume of foam material needed. By reflecting back most of the radio waves entering through the foam back into the foam, the foam gets a further chance to absorb energy that it could not absorb earlier.

Note that some radio absorbing foams on the market have conducting layers built into them. If such foam is used in one embodiment, then the shielding element can be said to have been partially incorporated into the foam.

Note that the setup of FIG. 6 may not achieve a complete reduction of antenna efficiency for dockee A, i.e. a complete reduction to zero of the sensitivity of the radio of A to signals from outside the foam. Some of these outside signals may be captured by the part of dockee A that is sticking outside of the cradle, and these signals will generally be conducted towards the radio circuit. Nevertheless, the foam element creates an antenna efficiency reduction that is high enough to be valuable in practice.

In addition to reducing the carrier sensitivity for the dockee, the foam element may reduce interference from signals sent from the antenna of the dockee and possibly from the antenna of the docking station, as experienced by other devices in the wireless environment. Advantageously, the snug fit and shielded radio environment created by the foam element may allow the docking station to more accurately detect 'physical docking', and the antennas of the dockee and the docking station may also be more accurately aligned with each other.

Radio Modification Module

In another embodiment of the invention, a radio modification module (RMM) is introduced in the dockee that gets a steering signal with at least two settings: 'normal' and 'modified.' The setting 'normal' means that the radio should behave according to the usual rules and practices of the communication scheme (e.g., Wi-Fi), and the setting 'modified,' which is associated with the dockee being physically docked, as explained in detail below, means that the carrier sense mechanism in the radio should be modified beyond what is normally applicable in the communication scheme, where modification includes at least one of: (a) disabling the carrier sense mechanism entirely, or (b) making it much less sensitive to carrier signals (e.g., setting the sensing threshold at a higher signal strength).

Figure 8:
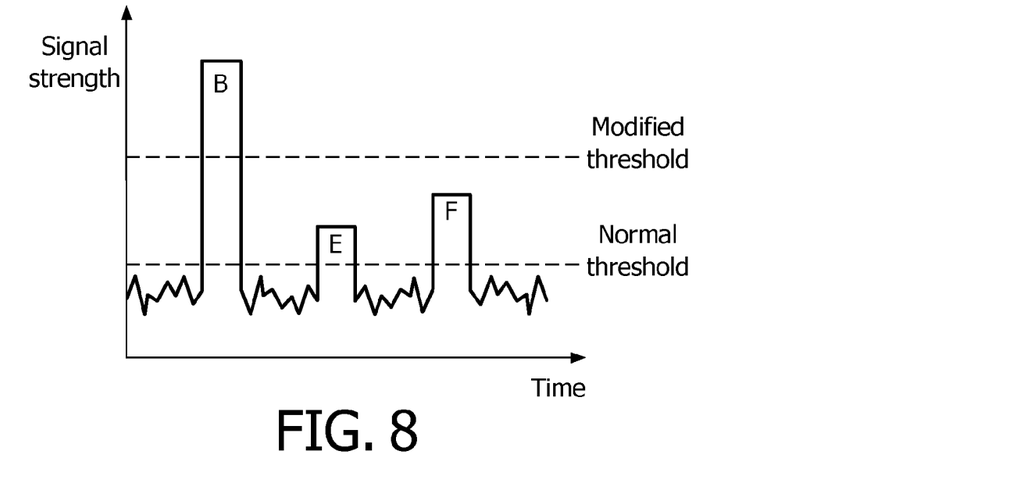
FIG. 8 shows signal strengths in relation to the normal and modified thresholds according to an embodiment of the invention.

FIG. 8 illustrates the situation of an embodiment where the sensing threshold is set to a higher signal strength level by the RMM. Therefore, the dockee, which can detect signals from the docking station B and other devices E and F using the normal threshold, will no longer be able to detect signals from devices E and F when the modified threshold is used for carrier sensing.

In one embodiment the steering signal is set depending on the specific design and/or user preference. For example, before docking the steering signal is set as 'normal', then after physical docking, the steering signal is set to 'modified', and then the steering signal is set back to 'normal' after undocking.

In one embodiment, when physical docking is done and/or the RMM is in the modified setting, the transmit power of the dockee radio is regulated to be lower than needed to cover the entire wireless environment, but high enough to reach at least one docking station antenna.

In another embodiment, a similar or symmetrical RMM is used to control the docking station radio, so that the docking station is able to communicate over long distances with the dockee when the dockee is physically undocked but still logically docked.

Figure 9:
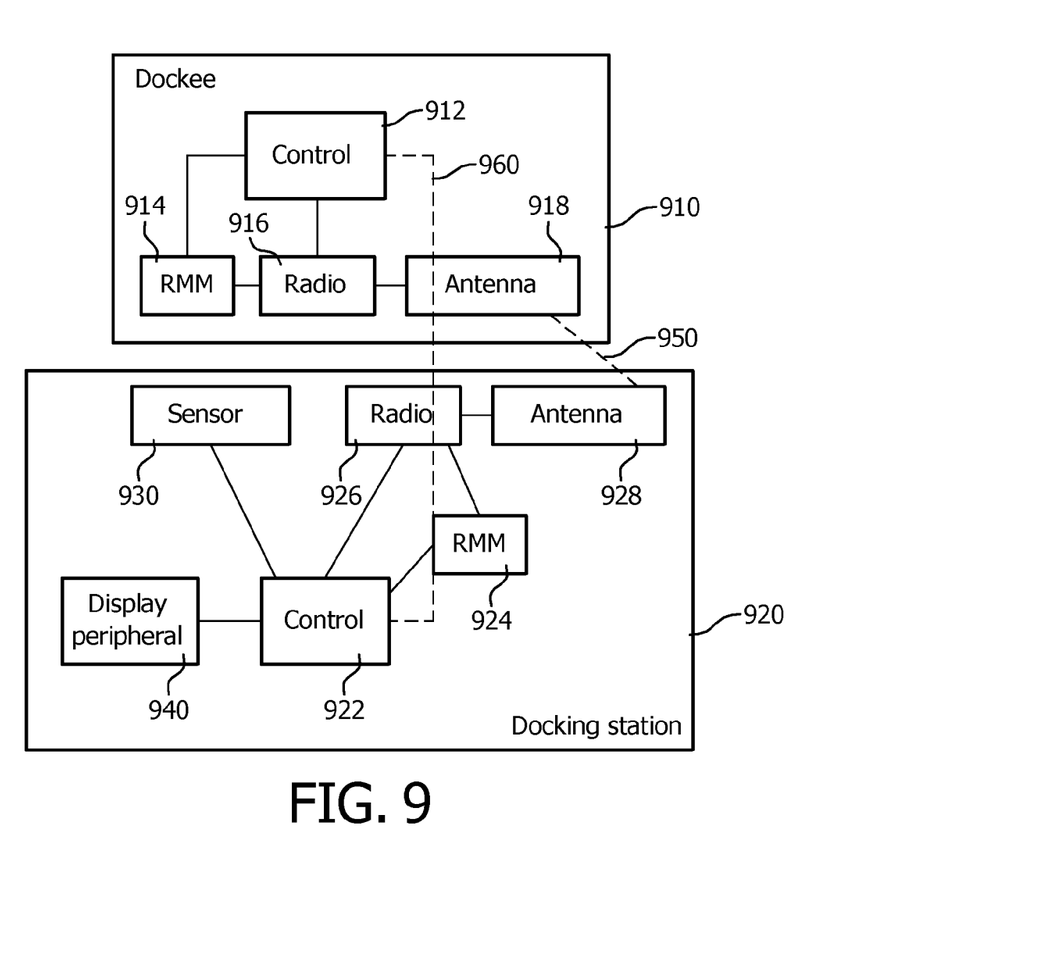
FIG. 9 shows a dockee with a docking station according to an embodiment of the invention.

FIG. 9 shows a wireless docking system according to an embodiment of the invention. The system includes a dockee 910 with a radio 916 connected to an antenna 918, and a docking station 920 with a radio 926 connected to an antenna 928. In this example, the radios are operating under the Wi-Fi 802.11n standard. However, other wireless standards are also applicable. The docking station 920 has a sensor 930 for detecting the physical docking. In this example, physical docking is the action of putting the dockee on top of the docking station, so that the sensor detects the presence of an object laid on top of the docking station. The sensor cannot sense that the object is an actual dockee, let alone the identity of the dockee, so, in addition to this sensor, radio signal strength measurements are used (as explained below) in order to create an intelligent system. In another embodiment, the sensor 930 may not be using any hardware that detects the physical presence of an object, but the sensor relies purely on radio signal strength measurements. In another embodiment, the sensor 930 uses sensing hardware or signal generating hardware inside the dockee 910 in addition to hardware in the docking station 920, or uses hardware that is placed exclusively in the dockee 910.

As indicated by the coupling line 950, there are wireless communications between the two antennas 918 and 928, allowing the control units 912 and 922 to communicate with each other to achieve docking—this higher-level communication between the control systems is shown with the line 960. Specifically, this communication allows the control unit 912 in the dockee 910 to be informed if physical docking has been detected, or if physical docking stops being detected.

RMM elements 914, 924 have been added to both the dockee 910 and the docking station 920 in this embodiment. The RMM elements 914, 924 are set up to receive signals from their respective control units 912, 922. The signals can be at least selected from 'normal' and 'modified.' If the signal to the RMM is 'modified', then this RMM changes settings on its attached radio 926/916 to: (a) increase the carrier sense threshold compared to the normal setting for Wi-Fi, which is preferably the only carrier sense that is done in advance of transmission of packets addressed to the dockee or docking station counterparty, and (b) lowers the signal strength used for packet transmissions by the radio (compared to the normal setting used for Wi-Fi), preferably only for the transmission of packets addressed to the dockee or docking station counterpart. Using the RMM elements allows the control of carrier sensing with minimal software changes to the dockee, so that some embodiments of the invention can be implemented by doing a system software upgrade in a dockee that is built as general purpose Wi-Fi device using standard technology. This can be achieved because it is possible to control the carrier sense mechanism of at least some Wi-Fi chipsets by external software, without having to have the radio modification module completely hard-coded in the chipset firmware.

The docking station 920 may include a display peripheral 940 so that display data in the dockee can be displayed on the display peripheral 940 after docking.

Figure 10:
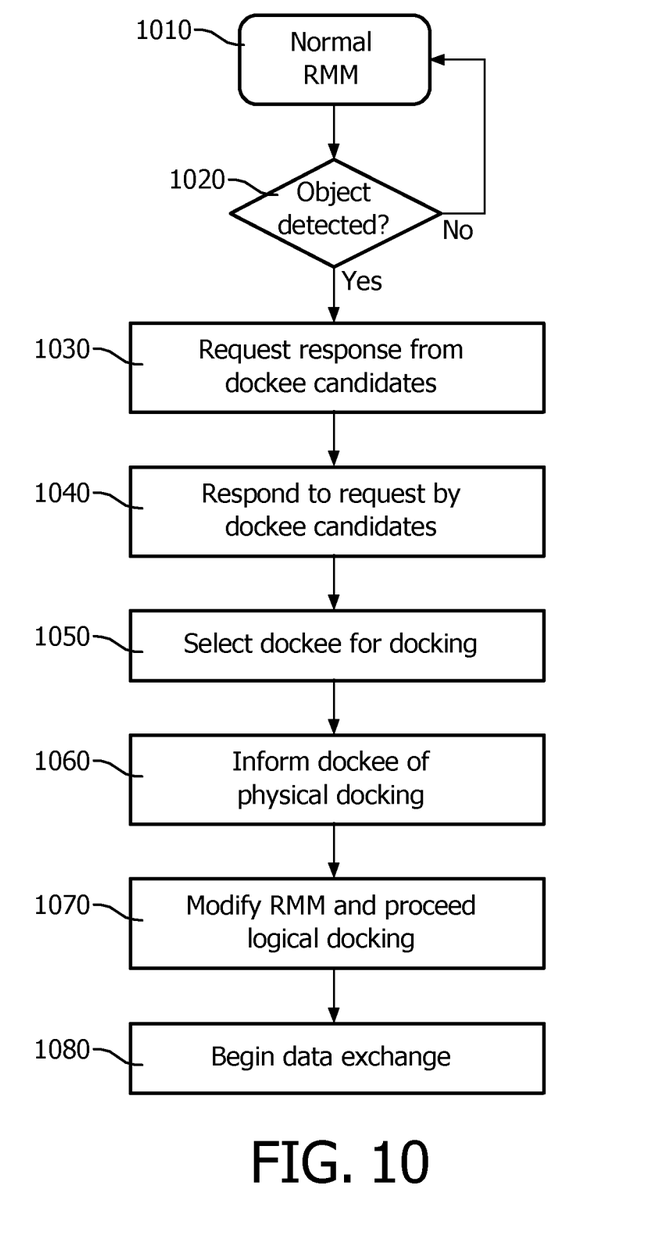
FIG. 10 shows the process flow of a first operations scenario according to an embodiment of the invention.

The functioning of this system is further illustrated by the following examples of operational scenarios and the associated protocols. FIG. 10 shows the operations process for a first scenario according to an embodiment. At the beginning 1010, the signal is 'normal', and the RMMs set the respective radios to the normal setting. At the beginning, the dockee is not yet docked, and is not lying on top of the docking station. The user now lays the dockee on top of the docking station, signaling intent to dock physically and logically.

The control system inside the docking station detects the presence of an object on top of it via the sensor in the detection loop 1020.

At 1030, the control system uses its radio to broadcast a request with a predetermined format over a predetermined Wi-Fi channel, according to the wireless docking standard. The request instructs any device capable of being a dockee that is in communications range to send back a response, stating its identity and also the signal strength with which the request packet was received.

At 1040, the dockee, being a device listening on the above predetermined channel, responds as described above.

At 1050, the docking station control system receives the response, as well as a second response from a dockee further away, and selects the response that indicated the strongest signal strength for the received request packet, thereby obtaining the identity (e.g. Wi-Fi MAC address) of the dockee that the user wanted to physically dock. Signal strength may be used here to measure nearness to the docking station. Other ways to measure nearness by sending signals, using more than a request single packet, are also possible, and might be preferred sometimes because they can offer higher accuracy.

At 1060, the docking station then informs the dockee, using its radio, addressing it by its identity, that it has been physically docked, and that logical docking should also proceed.

At 1070, a 'modified' signal is sent to the RMMs, and the RMMs modify the setting in the radios. The dockee and the docking station work together to complete the logical docking process.

At 1080, the dockee is now able to send data to the docking station, e.g., display data to the display peripheral managed by the docking station.

This improves the performance of the docking communication link, because the radios are no longer influenced by carrier signals coming from other devices.

Figure 11:
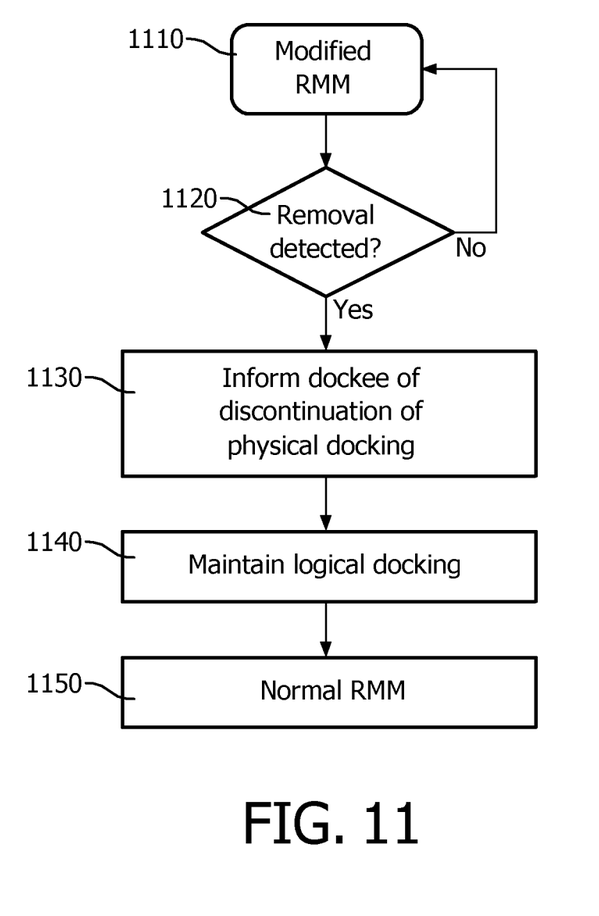
FIG. 11 shows the process flow of a second operations scenario according to an embodiment of the invention.

FIG. 11 shows the operations process for a second scenario according to an embodiment. At 1110, the dockee is docked with the docking station. Therefore, the current signal is 'modified' and the RMMs set the operation of the respective radios accordingly. A user picks up the dockee, for example, because the user tries to answer an incoming call. The docking station detects via its sensor that there is no longer any physical docking in the detection loop 1120.

At 1130 the docking station, using its radio, informs the dockee of the discontinuation of physical docking. This does not trigger logical undocking, since the radios are still in range, so the logical docking relation is continued at 1140.

At 1150, the control in the docking station changes the signal to its RMM to 'normal', and also instructs the control in the dockee, via its radio, that physical docking has ended, and that it should change the signal to its RMM to 'normal.' This allows the link connectivity between the radios to be kept, even as the distance between dockee and docking station grows. Link performance is again influenced and lowered by other devices in the wireless environment.

Figure 12:
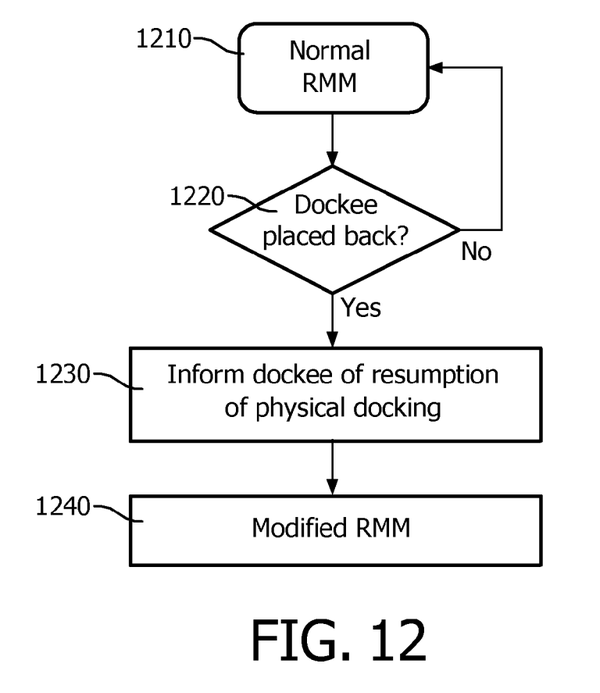
FIG. 12 shows the process flow of a third operations scenario according to an embodiment of the invention.

FIG. 12 shows the operations process for a third scenario according to an embodiment. This scenario illustrated in FIG. 12 follows the actions in the second scenario illustrated in FIG. 11. At 1210, since the user took the dockee out previously to answer the phone call, the current signal is 'normal', and the RMMs set the operation of the respective radios accordingly. The control system of the docking station detects physical docking again via the sensor in the detection loop 1220. At 1230, the docking station informs the dockee, using its radio, that physical docking is resumed. At 1240, the signals to both RMMs are set to 'modified' again.

Figure 13:
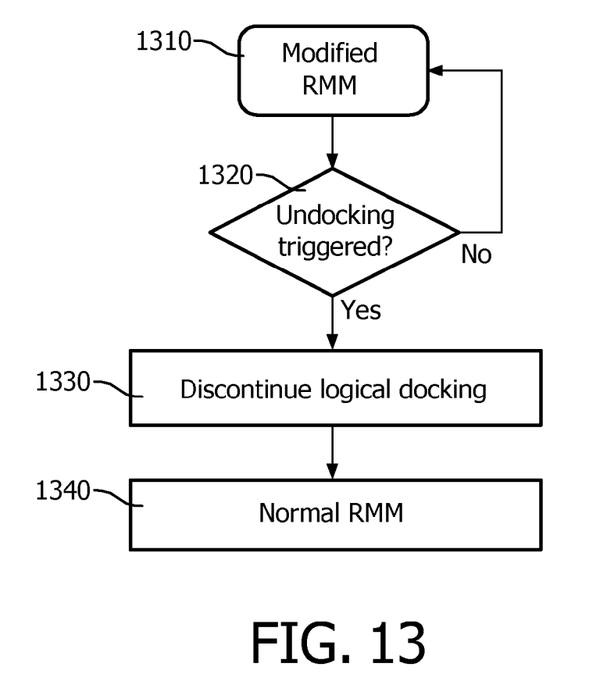
FIG. 13 shows the process flow of a fourth operations scenario according to an embodiment of the invention.

FIG. 13 shows the operations process for a fourth scenario according to an embodiment. In the fourth scenario an undocking action is triggered, for example, by pressing a button on the dockee, indicating that, for example, a user wants to undock. At 1310, the RMM is in the "modified" state. An undocking is triggered in the detection loop 1320. At 1330, in response to this trigger, docking station and dockee end the logical docking relation. At 1340, both RMM signals are changed to 'normal' again. The user may pick up the dockee and may start working with the application on the undocked device.

In one embodiment, the docking station can work as a wireless relay, or provide Internet connectivity to the dockee, because it is connected to the Internet using a wired connection, e.g., via an Ethernet cable. Therefore, this embodiment has the advantage that an RMM does not necessarily have to be designed to work on a per-packet basis and may maintain Internet connectivity while the RMM signal is 'modified'.

This invention is applicable to: wireless docking, and other environments in which a wireless connection needs to be made in a crowded radio environment, where the user has the liberty to place their wireless device in a certain fixed location.

Certain embodiments herein provide a link between a dockee and a docking station which is harder to monitor or jam from a distance. Usually encryption will be used to secure communications, but an extra layer of protection provided by the invention is an advantage over other wireless docking solutions.

While the above description of several embodiments places the sensor 930 in the docking station, and the initiative for many of the actions triggered by the sensor in the controller of the docking station, alternative embodiments provide the sensor in the dockee and the dockee controller taking the initiative. In one such possible embodiment, the dockee uses an NFC (near-field communication RFID) sensor to detect and scan an NFC tag present inside the docking station.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination or devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A docking station for wireless docking with a dockee in a shared radio spectrum environment using a standard with a carrier sensing mechanism for communications, the docking station comprising:
   a radio;
   an antenna connected to the radio, wherein the radio is configured to cause a carrier detection threshold of the carrier sensing mechanism to be higher when the dockee is docked than when the dockee is undocked.

2. The docking station according to claim 1, further comprising a noise generator configured to transmit first signals in order to raise a noise floor for second signals received in the dockee to a level that masks radio transmissions in a radio environment other than the docking station.

3. The docking station according to claim 1, wherein the antenna of the docking station is directional so that signals transmitted from the docking station are directed toward the dockee when docked.

4. The docking station according to claim 1, wherein the docking station is configured to provide a transit power control (TPC) report to the dockee that implements the TPC, such that the docking station can provide feedback to the dockee for lowering transmit power settings used by the dockee when docked.

5. The docking station according to claim 1, wherein the docking station further comprises:
   a sensor for detecting a physical docking between the dockee and the docking station; and
   a control system configured to change the carrier detection threshold based on the sensor.

6. The docking station according to claim 5, wherein the carrier detection threshold is increased in a docked state compared to a normal value.

7. The docking station according to claim 6, wherein the docking station is further configured to lower, in the docked state, a signal strength used for packet transmissions by the radio.

8. A docking station for wireless docking with a dockee in a shared radio spectrum environment with a carrier sensing mechanism for communication with the docking station, the docking station comprising:
   a radio connected to an antenna; and
   a radio absorber having a slot for inserting the dockee, such that when the dockee is inserted, the radio absorber substantially surrounds a dockee antenna, wherein the radio absorber is made of a radio absorbing material for absorbing energy of passing radio signals.

9. The docking station according to claim 8, wherein the radio absorber is made of a flexible radio absorbing material and is configured to deform so as to accept and substantially surround antennas of different types of dockees having a range of sizes.

10. The docking station according to claim 8, further comprising a shielding element for reflecting radio signals to the radio absorber.

11. The docking station according to claim 10, wherein the shielding element is built into the radio absorber.

12. The docking station according to claim 8, wherein the radio absorber is a foam comprising a conducting material.

13. A wireless docking system in a shared radio spectrum environment wherein a dockee is configured with a first radio connected to a first antenna using a standard with a carrier sensing mechanism for communications, and a docking station is configured with a second radio connected to a second antenna, the wireless docking system further comprising:
   a first radio modification module for switching the first radio between at least a first mode and a second mode;
   a sensor for detecting a physical docking between the dockee and the docking station; and
   a control system configured to change between the first mode and the second mode based on the sensor detecting the physical docking.

14. The system according to claim 13, wherein the wireless docking system further comprises a second radio modification module for switching the second radio between at least the first mode and the second mode, wherein the control system is further configured to change between the first mode and the second mode based on the sensor detecting the physical docking.

15. The system according to claim 14, wherein a carrier detection threshold in the first and second radio is different in the first mode than in the second mode.

16. The system according to claim 14, wherein a transmission power in the first and second radio is different in the first mode than in the second mode.

17. The system according to claim 13, wherein the sensor is configured to detect the physical docking by a proximity sensing.

18. The system according to claim 13, wherein the sensor is configured to detect the physical docking by radio signal strength measurements between the first antenna and the second antenna.

19. The system according to claim 13, wherein the control system includes controllers in the dockee and the docking station that communicate with each other.

20. The system according to claim 13, wherein the first or second radio modification module is configured to switch between the first and second mode on a per-packet basis.

21. The system according to claim 13, wherein the docking station further comprises a noise generator configured to transmit a noise signal that masks transmissions in a radio environment, such that within an area around the dockee the noise signal does not prevent transmissions by the second radio of the docking station from being detected or received by the first radio of the dockee.

22. The system according to claim 13, wherein the docking station further comprises a radio absorber having a slot for inserting the dockee, such that when the dockee is inserted, the radio absorber substantially surrounds the first antenna of the dockee, wherein the radio absorber is made of a radio absorbing material for absorbing energy of passing radio signals.

\* \* \* \* \*